United States Patent

Gamou

[11] Patent Number: 6,040,855
[45] Date of Patent: Mar. 21, 2000

[54] COLOR SIGNAL ADJUSTMENT APPARATUS

[75] Inventor: Naoyasu Gamou, Kanagawa, Japan

[73] Assignee: Sony Corporation, Tokyo, Japan

[21] Appl. No.: 08/801,519

[22] Filed: Feb. 18, 1997

[30]    Foreign Application Priority Data

Feb. 20, 1996 [JP]  Japan .................................... 8-032516

[51] Int. Cl.[7] .................................................. H04N 5/228
[52] U.S. Cl. ........................... 348/223; 348/645; 348/649
[58] Field of Search .................................... 348/223, 225,
348/643, 644, 645, 646, 654, 659, 678,
679, 708, 653, 660, 661, 662; 358/515,
516, 519; H04N 9/64, 9/68, 9/71

[56]              References Cited

U.S. PATENT DOCUMENTS

| 3,662,097 | 5/1972 | Rennick ............................ 178/5.4 HE |
| 4,364,080 | 12/1982 | Vidovic .................................... 358/185 |
| 5,272,523 | 12/1993 | Yu ............................................ 358/30 |
| 5,315,413 | 5/1994 | Yamamoto et al. ..................... 358/512 |

FOREIGN PATENT DOCUMENTS

| 19 16 690 B | 11/1969 | Germany . |
| 1268936 | 3/1972 | United Kingdom ............. H04N 9/52 |
| 2 208 460 | 3/1989 | United Kingdom ............. H04N 1/46 |

OTHER PUBLICATIONS

Journal of the SMPTE, vol. 78, No. 9, Sep. 1969, pp. 696–700, XP002040858, J. Monahan et al. "Color Correction Techniques For Television Cameras".

Primary Examiner—Michael H. Lee
Attorney, Agent, or Firm—Frommer, Lawrence & Haug, LLP; William S. Frommer; Dennis M. Smid

[57]              ABSTRACT

A color signal adjustment circuit used in, for example, a camera device, in which specified color signals can be adjusted and, in addition, color signals can be adjusted with a smaller information volume. A chroma SIO 41 generates a pre-set control signal, under control by a micro-computer 50 subject to a setting operation on an operating unit, and judges, at the time of conversion of the color difference signal in the phase/gain control circuit 36, if the phase processing or gain processing is carried out, which of the (R-Y) signal and the (B-Y) signal is controlled and in which quadrant the color adjustment is made, in order to send X and Z signals meeting with these judgment conditions to a phase/gain adjustment circuit 36B pixel-by-pixel. The phase/gain adjustment circuit 36B generates (R-Y) and (B-Y) signals from (R-G) and (B-G) signals based on the X and Z signals.

3 Claims, 3 Drawing Sheets

COLOR SIGNAL ADJUSTMENT APPARATUS

BACKGROUND OF THE INVENTION

1. Field of the Invention

This invention relates to a color signal adjustment device used in, for example, a camera device.

2. Description of the Related Art

There is known a camera device in which red (R), green (G) and blue (B) color signals, obtained on imaging an object, are processed with chroma signal processing for generating (R-Y) and (B-Y) color difference signals. In this camera device, the (R-Y) and (B-Y) are found by the following equations:

$$R\text{-}Y = X|(R\text{-}G) + Z(B\text{-}G)|$$

where X: gain of the (R-Y) signal and
Z: phase of the (R-Y) signal $$B\text{-}Y = X|(B\text{-}G) + Z(B\text{-}G)|$$

where X: gain of the (B-Y) signal
Z: phase of the (B-Y) signal.

Therefore, in adjusting the color signal using these color signals, the signs of the (R-G) signal and the (B-G) signal as parameters are discriminated for deciding whether these signals define the (R-Y) signal or the (B-G) signal. Subsequently, the coefficients of X and Z are determined. That is, if the sign of the (R-G) signal is plus or minus, the gain of the (R-Y) signal becomes positive or negative, respectively. On the other hand, if the sign of the (B-G) signal is plus or minus, the phase of the (R-Y) signal becomes positive or negative, respectively.

Similarly, if the sign of the (R-G) signal is plus or minus, the phase of the (B-Y) signal becomes positive or negative, respectively. On the other hand, if the sign of the (B-G) signal is plus or minus, the gain of the (B-Y) signal becomes positive or negative, respectively.

After the signs of the gain and the phase are set in this manner, X and Z are set.

However, since the (R-Y) and (B-Y) signals have the (R-G) and (B-G) signals as parameters, respectively, as described above, the phase of the (B-Y) signal is increased if the gain of the (R-Y) signal is increased, such that the phase or the gain, which are not desired to be adjusted, are undesirably changed.

On the other hand, there are eight parameters of the (R-Y) and (B-Y) signals in all, as described above, such that, if each parameter is of one bit, eight bits are perpetually required. The result is that, if color signal adjustment employing the above-mentioned eight color difference signals for each pixel, the information volume becomes excessive, thus delaying the transfer rate of each parameter.

SUMMARY OF THE INVENTION

It is therefore an object of the present invention to provide a color signal adjustment circuit whereby specified color signals can be adjusted and whereby color signal adjustment can be realized with a small information volume.

The color signal adjustment apparatus according to the present invention includes first color difference signal generating means for generating a (R-G) signal and a (B-G) signal from R, G and B signals, and second color difference generating means for generating, in a (B-Y)–(R-Y) coordinate system having a (B-Y) signal and an (R-Y) signal as an abscissa and an ordinate, respectively, the (R-Y) signal and the (B-Y) signal, using the (R-G) signal and the (B-G) signal from the first color difference signal generating means, in accordance with the following equations:

$$R\text{-}Y = X\{(R\text{-}G) + Z(B\text{-}G)\}$$

where X: gain of the (R-Y) signal
Z: phase of the (R-Y) signal; and $$B\text{-}Y = X\{(B\text{-}G) + Z(R\text{-}G)\}$$

where X: gain of the (B-Y) signal; and
Z: phase of the (B-Y) signal.

The color signal adjustment apparatus according to the present invention also includes first parameter outputting means for outputting a gain and a phase for the (R-Y) signal and a gain and a phase for the (B-Y) signal in the first quadrant in the (B-Y)–(R-Y) coordinate system, and second parameter outputting means for outputting a gain and a phase for the (R-Y) signal and a gain and a phase for the (B-Y) signal in the second quadrant in the (B-Y)–(R-Y) coordinate system. The color signal adjustment apparatus also includes third parameter outputting means for outputting a gain and a phase for the (R-Y) signal and a gain and a phase for the (B-Y) signal in the third quadrant in the (B-Y)–(R-Y) coordinate system, and fourth parameter outputting means for outputting a gain and a phase for the (R-Y) signal and a gain and a phase for the (B-Y) signal in the fourth quadrant in the (B-Y)–(R-Y) coordinate system. The color signal adjustment apparatus also includes selection means for switchingly selecting the gain or the phase from the first parameter setting means, second parameter setting means, third parameter setting means and the fourth parameter setting means, and sending the selected gain or phase to the second color difference generating means, and control means for controlling the selection means based on the (R-G) signal and the (B-G) signal from the first color difference signal generating means. With the above-described color signal adjustment circuit according to the present invention, the gain X and the phase Z can be set for effecting color signal adjustment of the (R-Y) and (B-Y) signals by discriminating four parameters comprised of positive and negative R-G signals and positive and negative B-G signals supplied to the second color difference signal generating means. Since the number of parameters required for conversion of the (R-Y) and (B-Y) signals can be reduced to one-half that required in the conventional circuit, the above-described color signal adjustment circuit contributes to improved communication speed between respective circuits.

In addition, with above-described color signal adjustment circuit, gain/phase conversion in the (B-Y) and (R-Y) coordinate systems can be controlled independently from one quadrant to another, such that there is no risk of the color signal adjustment for a given quadrant being made during color signal adjustment for another quadrant. Moreover, the gain/phase adjustment may be achieved for plural quadrants simultaneously.

DESCRIPTION OF THE PREFERRED EMBODIMENTS

Figure 1:
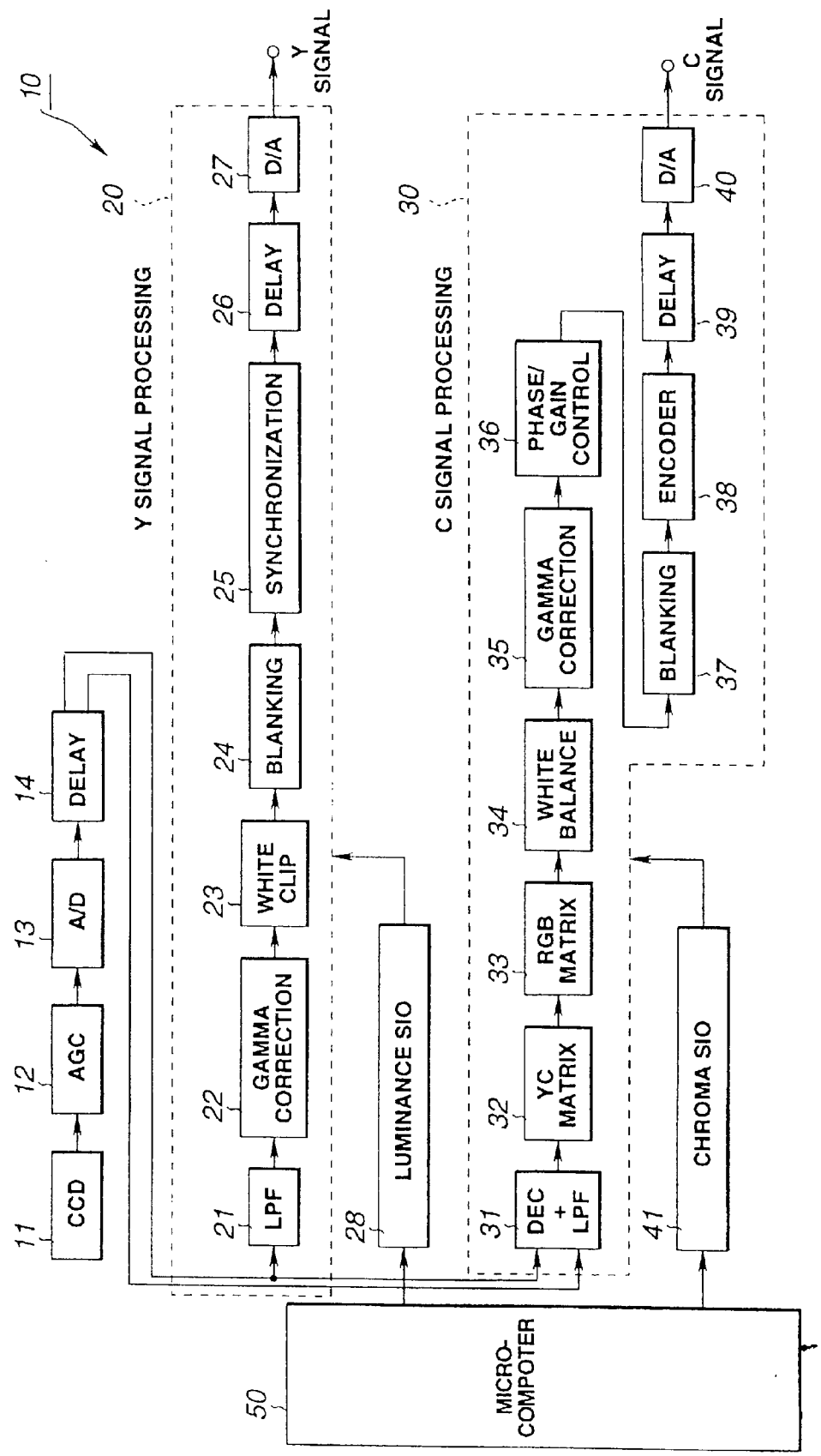
FIG. 1 is a block diagram showing the structure of a camera device embodying the present invention.

Referring to the drawings, preferred embodiments of the present invention will be explained in detail. The present invention is directed to a color signal adjustment circuit for effecting color signal adjustment from pixel to pixel.

Referring to FIG. 1, the camera device embodying the present invention includes an imaging signal processing unit 10 for outputting generated imaging signals and also outputting an imaging signal delayed by one horizontal scanning period (1H), and a Y-signal processing unit 20 for generating Y signals (luminance signals) from the supplied imaging signals. The camera device also includes a luminance serial I/O interface or luminance SIO 28 for processing signals of the Y-signal processing unit 20 and a C signal processing unit 30 for generating carrier color signals (C signals) from the supplied imaging signals and from the imaging signals delayed by 1H. The camera device additionally includes a chroma serial I/O interface or chroma SIO 41 for processing signals of the C signal processing unit 30 and a micro-computer 50 for controlling the operation of the luminance SIO 28 and the chroma SIO 41.

The imaging signal processing unit 10 has a CCD image sensor 11, an automatic gain control circuit (AGC circuit) 12, an A/D converter 13 and a delay circuit 14, as shown for example in FIG. 1.

The CCD image sensor 11 generates imaging signals corresponding to the imaging light of the object and sends the imaging signals to a sample-and-hold circuit, not shown. The sample-and-hold circuit sample-holds the supplied imaging signals to reduce so-called random noise to send the resulting imaging signals to the AGC circuit 12. The AGC circuit 12 detects the difference in level of the imaging signals to adjust the gain of the imaging signals. The A/D converter 13 converts the imaging signals from the AGC circuit 12 into digital signals to send the imaging data to the delay circuit 14.

The delay circuit 14 sends the imaging data to the Y-signal processing unit 20 and to the C-signal processing unit 30, while sending the imaging data delayed by 1H to the C-signal processing unit 30.

The Y-signal processing unit 20 has a low-pass filter (LPF) 21, a gamma correction circuit 22, a white clip circuit 23, a blanking inserting circuit 24, a synchronization appendage circuit 25, a delay circuit 26 and a D/A converter 27, as shown in FIG. 1.

The LPF 21 takes out Y signals contained in the imaging data from the imaging signal processing unit 10 to send the Y-signals to the gamma correction circuit 22. The gamma correction circuit 22 performs gamma correction of the Y-signals to send the resulting Y-signals to the white clip circuit 23. The white clip circuit 23 compresses the Y-signals, supplied at a quadruple rate of the standard level rate, by a factor of 1.1 to 1.3, and sends the resulting Y-signals to the blanking insertion circuit 24. The blanking insertion circuit 24 first pulls down the blanking period of the Y-signals to a position sufficiently below the black level, for removing unneeded sporadic signals superimposed in the blanking period and subsequently performs black-clipping to send the resulting Y-signals to the synchronization appendage circuit 25. The synchronization appendage circuit 25 appends the synchronization signal to the Y-signals to send the resulting signals to the delay circuit 26. The delay circuit 26 delays the Y-signals a pre-set amount for phase matching with respect to the C-signals outputted by the C-signal processing unit 30 and outputs the resulting analog Y-signals via D/A converter 27.

The luminance SIO 28 performs control operations for gamma correction, white clipping or blanking insertion in the Y-signal processing unit 20 under control by the micro-computer 50.

The C-signal processing unit 30 includes an LPF 31, a YC matrix circuit 32, an RGB matrix circuit 33, a white balance adjustment circuit 34, a gamma correction circuit 35, a phase/gain control circuit 36, a blanking insertion circuit 37, an encoder 38, a delay circuit 39 and a D/A converter 40.

The LPF 31 removes components of unneeded frequency bands of the imaging data offset by 1H as described above. The YC matrix circuit 32 generates Y-signals and C-signals from the imaging data offset by 1H to route the generated Y-signals and C-signals to the RGB matrix circuit 33. The RGB matrix circuit 33 generates red (R), green (G) and blue (B) color signals from the Y and C signals t route the respective color signals to the white balance circuit 34. For preventing picture deterioration during imaging of a white object at different color temperatures, the white balance adjustment circuit 34 adjusts the ratio of respective color signals obtained on imaging the white object to 1:1:1 to route the respective color signals to the gamma correction circuit 35. The gamma correction circuit 35 gamma-corrects the R, G and B color signals to route the resulting signals to the phase/gain control circuit 36. The phase/gain control circuit 36 generates pre-set color difference signals from the respective color signals and adjusts the phase and the gain with the color difference signals as coordinate axes, by way of performing color signal adjustment, in a manner which will be subsequently explained in detail. The blanking insertion circuit 37 pulls down the blanking period of the color-signal-adjusted color difference signals sufficiently below the black level to insert the blanking and routes the color difference signals to the encoder 38. The encoder 38 generates C-signals of the NTSC (National television System Committee) system from the pre-set color difference signals and routes the resulting C-signals to the delay circuit 39. The delay circuit 39 delays the C-signals in a pre-set amount for synchronization with the Y-signals and outputs the color-signal-adjusted C-signals via D/A converter 40.

Figure 2:
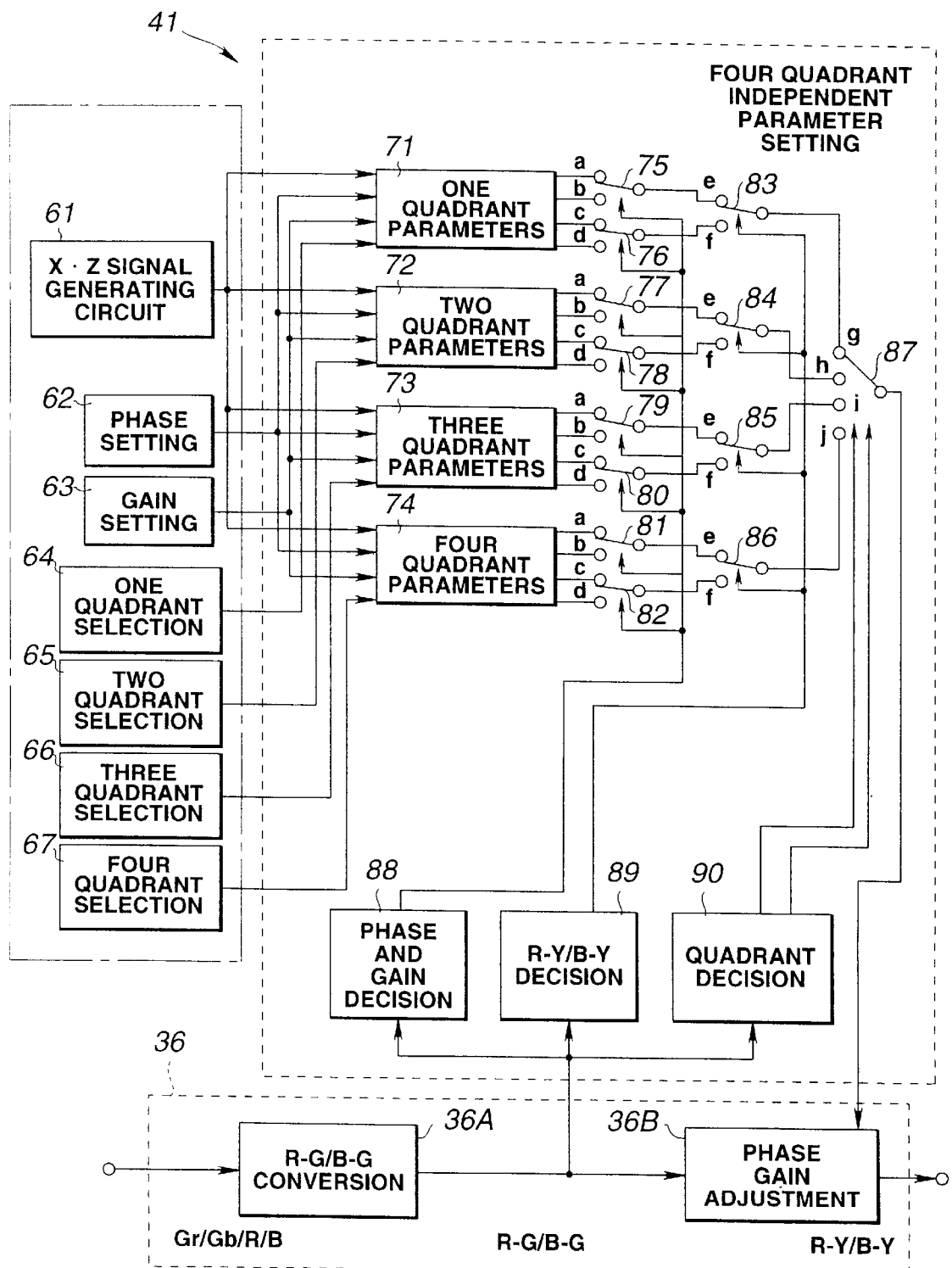
FIG. 2 is a block diagram showing a specified structure of a color signal adjustment circuit according to the present invention.
Figure 3:
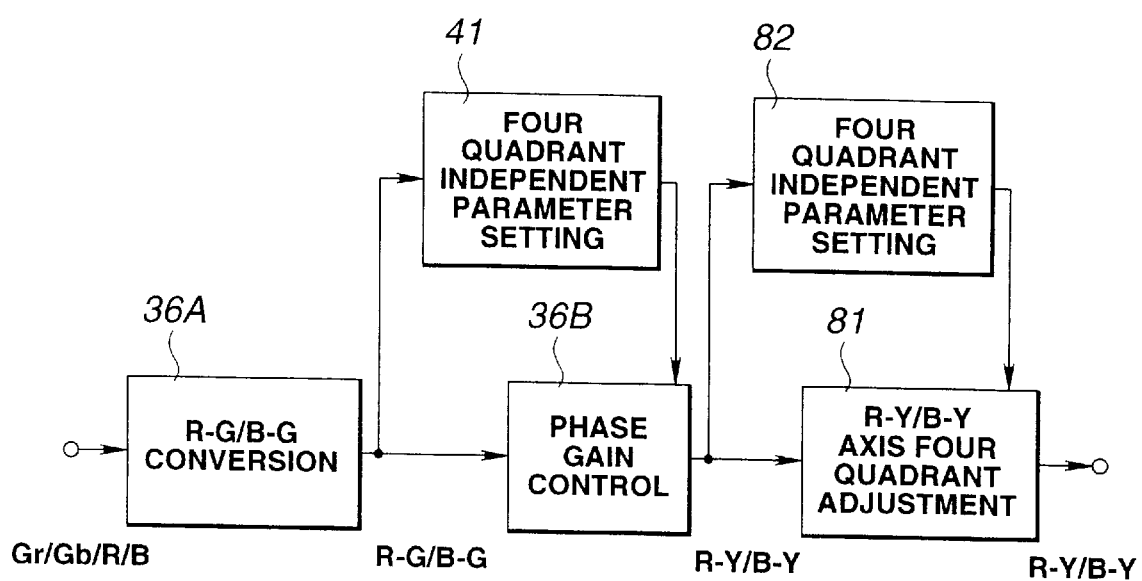
FIG. 3 illustrates a modification of the color signal adjustment circuit.

Referring to FIG. 2, the phase/gain control circuit 36 includes an (R-G)/(B-G) converting circuit 36A for generating (R-G) signal and the (B-G) signal from the respective color signals of R, G and B and a phase/gain adjustment circuit 36B for generating (R-Y) and (B-Y) signals from the (R-G) and (B-G) signals in accordance with the following equations (1) and (2):

$$R-Y=X\{(R-G)+Z(B-G)\} \tag{1}$$

where X: gain of the (R-Y) signal
Z: phase of the (R-Y) signal $$B-Y=X\{(B-G)+Z(R-G)\} \tag{2}$$

where X: gain of the (B-Y) signal
Z: phase of the (B-Y) signal

The (R-G)/(B-G) conversion circuit 36A converts the respective color signals from the gamma correction circuit 35 into color difference (R-G) and (B-G) signals to route the color difference signals to a phase/gain adjustment circuit 36B. The phase/gain adjustment circuit 36B performs processing of the above equations, pixel by pixel, based on X and Z signals from the chroma SIO 41, as later explained, for generating (R-Y) and (B-Y) signals.

Similarly to the luminance SIO 28, the chroma SIO 41 performs white balance and gamma correction in the C-signal processing unit 30, under control by the micro-computer 50, while generating X and Z signals and routing these signals to the phase/gain adjustment circuit 36B.

Specifically, the chroma SIO 41 has an X•Z signal generating circuit 61, a phase setting circuit 62, a gain setting circuit 63, a first quadrant selection circuit 64, a second quadrant selection circuit 65, a third quadrant selection circuit 66 and a fourth quadrant selection circuit 67.

The X•Z signal generating circuit 61 generates X and Z signals, required in the equations (1) and (2), under control by the micro-computer 50.

Responsive to the setting operation by the above-mentioned setting unit, the micro-computer 50 computes a gain $X_R$ of the (R-Y) signal, a phase $Z_R$ of the (R-Y) signal, a gain $X_B$ of the (B-Y) signal, and a phase $Z_B$ of the (B-Y) signal, for each of the first to fourth quadrants in the (B-Y) and (R-Y) coordinate systems, and routes the computed results to the X•Z signal generating circuit 61.

Thus the X•Z signal generating circuit 61 generates the gain signal $X_{R1}$ and the phase signals $Z_{R1}$ of the (R-Y) signals of the first quadrant, while generating the gain signal $X_{B1}$ and the phase signals $Z_{R1}$ of the (B-Y) signals of the first quadrant. Similarly, the X•Z signal generating circuit 61 generates $X_{R2}$, $Z_{R2}$, $X_{B2}$, $Z_{B2}$ signals for the second quadrant, while generating $X_{R3}$, $Z_{R3}$, $X_{B3}$ and $Z_{B3}$ signals and $X_{R4}$, $Z_{R4}$, $X_{B4}$ and $Z_{b4}$ signals for the third and fourth quadrants, respectively. The X•Z signal generating circuit 61 sends these X and Z signals to a first quadrant parameter circuit 71, a second quadrant parameter circuit 72, a third quadrant parameter circuit 73 and to a fourth quadrant parameter circuit 74.

If phase adjustment is turned off by the operation of the above operating unit, the phase setting circuit 62 performs control, under control by the micro-computer 50, so that no Z-signals will be outputted by the first quadrant parameter circuit 71, second quadrant parameter circuit 72, third quadrant parameter circuit 73 nor fourth quadrant parameter circuit 74.

If phase adjustment is turned off by the operation of the above operating unit, the gain setting circuit 63 performs control, under control by the micro-computer 50, so that no X-signals will be outputted by the first quadrant parameter circuit 71, second quadrant parameter circuit 72, third quadrant parameter circuit 73 nor fourth quadrant parameter circuit 74.

If the above operating unit is actuated for performing the color signal adjustment of the first quadrant, the first quadrant selection circuit 64 controls the first quadrant parameter circuit 71, under control by the micro-computer 50, for outputting X and Z signals supplied from the X•Z signal generating circuit 61.

If the above operating unit is actuated for performing the color signal adjustment of the second quadrant, the second quadrant selection circuit 65 controls the second quadrant parameter circuit 72, under control by the micro-computer 50, for outputting X and Z signals supplied from the X•Z signal generating circuit 61.

If the above operating unit is actuated for performing the color signal adjustment of the third quadrant, the third quadrant selection circuit 66 controls the third quadrant parameter circuit 73, under control by the micro-computer 50, for outputting X and Z signals supplied from the X•Z signal generating circuit 61.

If the above operating unit is actuated for performing the color signal adjustment of the fourth quadrant, the fourth quadrant selection circuit 67 controls the third quadrant parameter circuit 74, under control by the micro-computer 50, for outputting X and Z signals supplied from the X•Z signal generating circuit 61.

The chroma SIO 41 has the above-mentioned first to fourth quadrant parameter circuits 71 to 74, switches 75 to 87, a phase/gain decision circuit 88, an (R-Y)/(B-Y) decision circuit 89 and a quadrant decision circuit 90.

Unless Z or X signals are set for not being outputted by the phase setting circuit 62 or the gain setting circuit 63, the first quadrant parameter circuit 71 outputs the $X_{R1}$ signal, $Z_{R1}$ signal, $X_{B1}$ signal and the $Z_{B1}$ signal from the X•Z signal generating circuit 61 at terminals a, b, c and d, respectively.

Unless Z or X signals are set for not being outputted by the phase setting circuit 62 or the gain setting circuit 63, the second quadrant parameter circuit 72 outputs the $X_{R2}$ signal, $Z_{R2}$ signal, $X_{B2}$ signal and the $Z_{B2}$ signal from the X•Z signal generating circuit 61 at terminals a, b, c and d, respectively.

Unless Z or X signals are set for not being outputted by the phase setting circuit 62 or the gain setting circuit 63, the third quadrant parameter circuit 73 outputs the $X_{R3}$ signal, $Z_{R3}$ signal, $X_{B3}$ signal and the $Z_{B3}$ signal from the X•Z signal generating circuit 61 at terminals a, b, c and d, respectively.

Unless Z or X signals are set for not being outputted by the phase setting circuit 62 or the gain setting circuit 63, the fourth quadrant parameter circuit 74 outputs the $X_{R4}$ signal, $Z_{R4}$ signal, $X_{B4}$ signal and the $Z_{B4}$ signal from the X•Z signal generating circuit 61 at terminals a, b, c and d, respectively.

The switch 75 outputs signals from terminals a and b of the first quadrant parameter circuit 71 under control by the phase/gain decision circuit 88. The switch 76 outputs signals from terminals c and d of the first quadrant parameter circuit 71 under control by the phase/gain decision circuit 88.

The switch 77 outputs signals from terminals a and b of the second quadrant parameter circuit 72 under control by the phase/gain decision circuit 88. The switch 78 outputs signals from terminals c and d of the second quadrant parameter circuit 72 under control by the phase/gain decision circuit 88.

The switch 79 outputs signals from terminals a and b of the third quadrant parameter circuit 73 under control by the phase/gain decision circuit 88. The switch 80 outputs signals from terminals c and d of the third quadrant parameter circuit 73 under control by the phase/gain decision circuit 88.

The switch 81 outputs signals from terminals a and b of the fourth quadrant parameter circuit 74 under control by the phase/gain decision circuit 88. The switch 82 outputs signals from terminals c and d of the fourth quadrant parameter circuit 74 under control by the phase/gain decision circuit 88.

The switch 83 outputs signals from the switch 75 or 76 under control by the (R-Y)/(B-Y) decision circuit 89. Similarly, the switch 84 outputs signals from the switch 77 or 78, while the switch 85 outputs signals from the switch 79 or 80 and the switch 86 outputs signals from the switch 81 or 82.

The switch 87 outputs a signal from one of the switches 83 to 86 under control by the quadrant decision circuit 90.

The phase/gain decision circuit 88 controls the switching of the switches 75 to 82 based on the (R-G) signal or the (B-G) signal supplied from the (R-G)/(B-G) conversion circuit 36A.

The phase/gain decision circuit 88 judges whether the supplied signal is for conversion of the (R-Y) signal or (B-Y) signal and whether the supplied signal itself is the (R-G) signal or the (B-G) signal. If the phase/gain decision circuit 88 decides that the (R-G) signal for the (R-Y) signal conversion has been supplied, or that the (B-G) signal for (B-Y) signal conversion has been supplied, the decision circuit 88 selects gain adjustment and sets the switches 75, 77, 79 and 81 to the terminal b, while setting the switches 76, 78, 80 and 82 to the terminal d. If the phase/gain decision circuit 88 decides that the (B-G) signal for (B-Y) signal conversion has been supplied, or that the (R-G) signal for (B-Y) signal conversion has been supplied, the decision circuit 88 selects phase adjustment and sets the switches 75, 77, 79 and 81 to the terminal a, while setting the switches 76, 78, 80 and 82 to the terminal c.

The (R-Y)/(B-Y) decision circuit 89 judges whether the (R-G) signal or the (B-G) signal supplied from the gain control circuit 36 is for (R-Y) signal conversion or for (B-Y) conversion. The (R-Y)/(B-Y) decision circuit 89 sets the switches 83 to 86 to the terminals e or f if the signal for (R-Y) signal conversion or the signal for (B-Y) signal conversion is supplied thereto, respectively.

The quadrant decision circuit 90 judges in which quadrant the adjustment of the color difference signal of the gain/phase should be performed, and accordingly controls the switching of the switch 87. For example, if the signs of the (R-G) signal and (B-G) signal are both +, the quadrant decision circuit 90 judges the color difference signal adjustment should be performed in the first quadrant. If the signs of the (R-G) signal and (B-G) signal are + and +, the quadrant decision circuit 90 judges the color difference signal adjustment should be performed in the second quadrant. If the signs of the (R-G) signal and (B-G) signal are − and +, the quadrant decision circuit 90 judges the color difference signal adjustment should be performed in the fourth quadrant. On the other hand, if the signs of the (R-G) signal and (B-G) signal are both −, the quadrant decision circuit 90 judges the color difference signal adjustment should be performed in the third quadrant. The quadrant decision circuit 90 sets the switch 87 to terminals g, h, i, or j if the conversion is in the first, second, third or fourth quadrant, respectively. The X and Z signals outputted by the switch 87 are routed to the phase/gain adjustment circuit 36B.

That is, the chroma SIO 41 generates a pre-set control signal, under control by the micro-computer 50, subject to the setting operation by the operating unit. The chroma SIO 41 judges which of the phase processing or the gain processing is carried out at the time of conversion of the color difference signal in the phase/gain control circuit 36, which of the (R-Y) signal or the (B-Y) signal is controlled, or in which quadrant the adjustment is performed, and routes X and Z signals satisfying the above decision conditions pixel by pixel to the phase/gain adjustment circuit 36B.

Thus it is possible for the phase/gain adjustment circuit 36B, fed with the X and Z signals for color signal adjustment from the switch 87, to output (R-Y) and (B-Y) signals, which are optimally color-signal-adjusted color difference signals, at the time of conversion from the (R-G) and (B-G) signals to (R-Y) and (B-Y) signals.

As described above, it is possible for the color signal adjustment circuit of the present invention to judge the four parameters comprised of the positive and negative (R-G) and (B-G) signals before performing signal conversion of the color difference signals by the phase/gain adjustment circuit 36B for deciding the gain X and the phase Z for performing color signal adjustment of the (R-Y) and (B-Y) signals.

Stated differently, with the above-described color signal adjustment circuit, the parameters required for conversion of the (R-Y) and (B-Y) signals may be reduced to one-half that required in the conventional circuit, thus contributing to improved communication speed between respective circuits.

In addition, it is possible with the above-described color signal adjustment circuit to control conversion of the gain and the phase in the (B-Y) and (R-Y) coordinate system for each quadrant independently, such that there is no risk of color signal adjustment being made for a quadrant during color signal adjustment for another quadrant, while the gain and the phase for plural quadrants can be controlled simultaneously.

Moreover, with the above-described color signal adjustment circuit, it is possible to adjust only the gain or only the phase in the above-mentioned coordinate system, while it is possible to set in which quadrant the gain adjustment or phase adjustment is performed, thus assisting the user in adjusting the color signals.

Meanwhile, the color signal adjustment circuit includes the (R-G)/(B-G) conversion circuit 36A, phase/gain adjustment circuit 36B, chroma SIO 41, (R-Y)/(B-Y) four-quadrant adjustment circuit 81 and the four-quadrant independent parameter setting unit 82 for enabling color signal adjustment to higher accuracy. Similarly to the chroma SIO 41, the four-quadrant independent parameter setting unit 82 adjusts the gain X and the phase Z of the (R-Y) and (B-Y) signals supplied to the (R-Y)/(B-Y) four-quadrant adjustment circuit 81.

Thus, with the above-described color signal adjustment circuit, since color signal adjustment is performed once in the (R-G)/(B-G) conversion circuit 36A, phase/gain adjustment circuit 36B and in the chroma SIO 41, the gain X and the phase Z are then again set in the four-quadrant independent parameter setting unit 82 and subsequently the (R-Y) and (B-Y) signals are outputted by the (R-Y)/(B-Y) four-quadrant adjustment circuit 81, thus achieving color signal adjustment to higher precision.

What is claimed is:

1. A color signal adjustment apparatus comprising:

first color difference signal generating means for generating a (R-G) signal and a (B-G) signal from R, G and B signals;

second color difference generating means for generating, in a (B-Y)–(R-Y) coordinate system having a (B-Y) signal and an (R-Y) signal, respectively, the (R-Y) signal and the (B-Y) signal, using the (R-G) signal and the (B-G) signal from said first color difference signal generating means, in accordance with the following equations:

$$R\text{-}Y = X\{(R\text{-}G) + Z(B\text{-}G)\}$$

where X: gain of the (R-Y) signal

Z: phase of the (R-Y) signal; and $$B\text{-}Y = X\{(B\text{-}G) + Z(R\text{-}G)\}$$

where X: gain of the (B-Y) signal

Z: phase of the (B-Y) signal;

first parameter outputting means for outputting a gain and a phase for the (R-Y) signal and a gain and a phase for the (B-Y) signal in the first quadrant in said (B-Y)–(R-Y) coordinate system;

second parameter outputting means for outputting a gain and a phase for the (R-Y) signal and a gain and a phase for the (B-Y) signal in the second quadrant in said (B-Y)–(R-Y) coordinate system;

third parameter outputting means for outputting a gain and a phase for the (R-Y) signal and a gain and a phase for the (B-Y) signal in the third quadrant in said (B-Y)–(R-Y) coordinate system;

fourth parameter outputting means for outputting a gain and a phase for the (R-Y) signal and a gain and a phase for the (B-Y) signal in the fourth quadrant in said (B-Y)–(R-Y) coordinate system;

selection means for switchingly selecting the gain or the phase from one of said first parameter setting means, second parameter setting means, third parameter setting means and the fourth parameter setting means, and sending the selected gain or phase to said second color difference generating means; and control means for controlling said selection means based on the (R-G) signal and the (B-G) signal from said first color difference signal generating means.

2. The color signal adjustment apparatus as claimed in claim 1 wherein said control means controls said switching means for outputting the gain for the (R-Y) signal of the first quadrant if the signs of the (R-G) signal and the (B-G) signal from the first color difference generating means are both positive and if said (R-G) signal and the (B-G) signal indicate the gain for the (R-Y) signal; said control means controlling p1 said switching means for outputting the gain for the (B-Y) signal of the first quadrant if the signs of the (R-G) signal and the (B-G) signal from the first color difference generating means are both positive and if said (R-G) signal and the (B-G) signal indicate the gain for the (B-Y) signal; said switching means controlling said switching means for outputting the phase for the (R-Y) signal of the first quadrant if the signs of the (R-G) signal and the (B-G) signal from the first color difference generating means are both positive and if said (R-G) signal and the (B-G) signal indicate the phase for the (R-Y) signal; said switching means controlling said switching means for outputting the phase for the (B-Y) signal of the first quadrant if the signs of the (R-G) signal and the (B-G) signal from the first color difference generating means are both positive and if said (R-G) signal and the (B-G) signal indicate the phase for the (B-Y) signal; said control means controlling said switching means for outputting the gain for the (R-Y) signal of the second quadrant if the signs of the (R-G) signal and the (B-G) signal from the first color difference generating means are positive and negative, respectively, and if said (R-G) signal and the (B-G) signal indicate the gain for the (R-Y) signal; said control means controlling said switching means for outputting the gain for the (B-Y) signal of the second quadrant if the signs of the (R-G) signal and the (B-G) signal from the first color difference generating means are positive and negative, respectively, and if said (R-G) signal and the (B-G) signal indicate the gain for the (B-Y) signal; said control means controlling said switching means for outputting the phase for the (R-Y) signal of the second quadrant if the signs of the (R-G) signal and the (B-G) signal from the first color difference generating means are positive and negative, respectively, and if said (R-G) signal and the (B-G) signal indicate the phase for the (R-Y) signal; said control means controlling said switching means for outputting the gain for the (B-Y) signal of the second quadrant if the signs of the (R-G) signal and the (B-G) signal from the first color difference generating means are positive and negative, respectively, and if said (R-G) signal and the (B-G) signal indicate the phase for the (B-Y) signal; said control means controlling said switching means for outputting the gain for the (R-Y) signal of the third quadrant if the signs of the (R-G) signal and the (B-G) signal from the first color difference generating means are both negative and if said (R-G) signal and the (B-G) signal indicate the gain for the (R-Y) signal; said control means controlling said switching means for outputting the gain for the (B-Y) signal of the third quadrant if the signs of the (R-G) signal and the (B-G) signal from the first color difference generating means are both negative and if said (R-G) signal and the (B-G) signal indicate the gain for the (B-Y) signal; said switching means controlling said switching means for outputting the phase for the (R-Y) signal of the third quadrant if the signs of the (R-G) signal and the (B-G) signal from the first color difference generating means are both negative and if said (R-G) signal and the (B-G) signal indicate the phase for the (R-Y) signal; said switching means controlling said switching means for outputting the phase for the (B-Y) signal of the third quadrant if the signs of the (R-G) signal and the (B-G) signal from the first color difference generating means are both negative and if said (R-G) signal and the (B-G) signal indicate the phase for the (B-Y) signal; said control means controlling said switching means for outputting the gain for the (R-Y) signal of the fourth quadrant if the signs of the (R-G) signal and the (B-G) signal from the first color difference generating means are negative and positive, respectively, and if said (R-G) signal and the (B-G) signal indicate the gain for the (R-Y) signal; said control means controlling said switching means for outputting the gain for the (B-Y) signal of the fourth quadrant if the signs of the (R-G) signal and the (B-G) signal from the first color difference generating means are negative and positive, respectively, and if said (R-G) signal and the (B-G) signal indicate the gain for the (B-Y) signal; said control means controlling said switching means for outputting the phase for the (R-Y) signal of the fourth quadrant if the signs of the (R-G) signal and the (B-G) signal from the first color difference generating means are negative and positive, respectively, and if said (R-G) signal and the (B-G) signal indicate the phase for the (R-Y) signal; said control means controlling said switching means for outputting the phase for the (B-Y) signal of the fourth quadrant if the signs of the (R-G) signal and the (B-G) signal from the first color difference generating means are negative and positive, respectively, and if said (R-G) signal and the (B-G) signal indicate the phase for the (B-Y) signal.

3. The color signal adjustment device as claimed in claim 1 wherein said selection means includes first selection means for switchingly selecting said first parameter outputting means, second parameter outputting means, third parameter outputting means or said fourth parameter outputting means;

second selection means for switchingly selecting the gain or the phase of the (R-Y) signal and the (B-Y) signal outputted by said first parameter outputting means, the gain or the phase of the (R-Y) signal and the (B-Y) signal outputted by said second parameter outputting means, the gain or the phase of the (R-Y) signal and the (B-Y) signal outputted by said third parameter outputting means, or the gain or the phase of the (R-Y) signal and the (B-Y) signal outputted by said fourth parameter outputting means; and third selection means for switchingly selecting the gain and the phase of the (R-Y) signal or the (B-Y) signal outputted by said first parameter outputting means, the gain and the phase of the (R-Y) signal or the (B-Y) signal outputted by said second parameter outputting means, the gain and the phase of the (R-Y) signal or the (B-Y) signal outputted by said third parameter outputting means, or the gain and the phase of the (R-Y) signal or the (B-Y) signal outputted by said fourth parameter outputting means.

* * * * *